(12) United States Patent
Tenebre et al.

(10) Patent No.: US 8,146,866 B2
(45) Date of Patent: Apr. 3, 2012

(54) ANTI-ICING / DE-ICING SYSTEM AND METHOD AND AIRCRAFT STRUCTURE INCORPORATING THIS SYSTEM

(75) Inventors: Pauline Tenebre, Thomery (FR);
Marc-Francois Six, Corquilleroy (FR)

(73) Assignee: Hutchinson (FR)

( * ) Notice: Subject to any disclaimer, the term of this patent is extended or adjusted under 35 U.S.C. 154(b) by 511 days.

(21) Appl. No.: 12/398,515

(22) Filed: Mar. 5, 2009

(65) Prior Publication Data
US 2009/0224104 A1   Sep. 10, 2009

(30) Foreign Application Priority Data

Mar. 5, 2008   (FR) ...................................... 08 01202

(51) Int. Cl.
*B64D 15/16*   (2006.01)
(52) U.S. Cl. .................................................. 244/134 R
(58) Field of Classification Search ............... 244/134 R, 244/134 D, 134 F
See application file for complete search history.

(56) References Cited

U.S. PATENT DOCUMENTS

| | | | | |
|---|---|---|---|---|
| 5,129,598 | A | * | 7/1992 | Adams et al. ............. 244/134 D |
| 5,206,806 | A | * | 4/1993 | Gerardi et al. ................. 340/582 |
| 5,272,400 | A | * | 12/1993 | Goldberg et al. ............... 310/10 |
| 5,467,944 | A | * | 11/1995 | Luukkala ................... 244/134 F |
| 5,474,261 | A | * | 12/1995 | Stolarczyk et al. ......... 244/134 F |
| 5,484,121 | A | * | 1/1996 | Padawer et al. ............ 244/134 F |
| RE38,024 | E | * | 3/2003 | Adams et al. .............. 244/134 D |
| 7,755,519 | B2 | * | 7/2010 | Bonutti ......................... 340/999 |

FOREIGN PATENT DOCUMENTS

| | | |
|---|---|---|
| DE | 198 26 168 | 8/1999 |
| DE | 10 2006 009480 | 8/2007 |
| WO | WO 00/68047 | 11/2000 |

OTHER PUBLICATIONS

Search Report from French Priority Application No. 08 01202, Filed Mar. 5, 2008.
Venna A V et al: "Piezoelectric Transducer Actuated Leading Edge De-Icing With Simultaneous Shear and Impulse Forces"; Journal of Aircraft, AIAA, Reston, VA, US; vol. 44, No. 2; Mar. 1, 2007; pp. 509-515; XP001540539.

* cited by examiner

*Primary Examiner* — Richard Price, Jr.
(74) *Attorney, Agent, or Firm* — Alston & Bird LLP

(57) ABSTRACT

The present invention provides an anti-icing/de-icing system and method using ultrasound waves for an external surface of a structure likely to be iced, such as an aircraft wing or engine nacelle, and such a structure incorporating this system. The system comprises a plurality of piezoelectric transducers with which the structure is fitted, opposite this external surface, and this system is such that it comprises scanning devices at least one matrix of elementary meshes predefined in this surface in relation to an even arrangement of a group of these transducers, these scanning devices being able to focus the waves emitted by all or some of the transducers of the or each group on these meshes one after the other, via signal summing devices coupled to these scanning devices and able to produce, for each mesh, a summation of the signals obtained from the transducers emitting these waves.

30 Claims, 3 Drawing Sheets

FIG.4
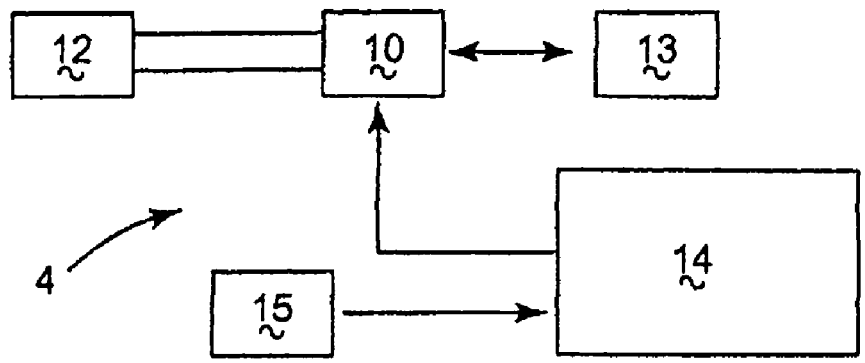
FIG.5
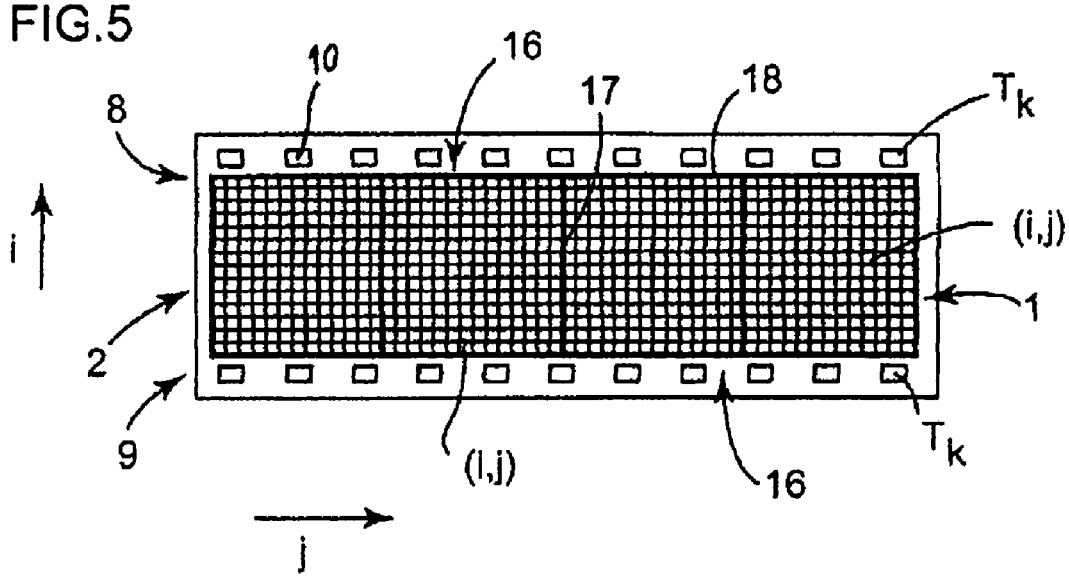
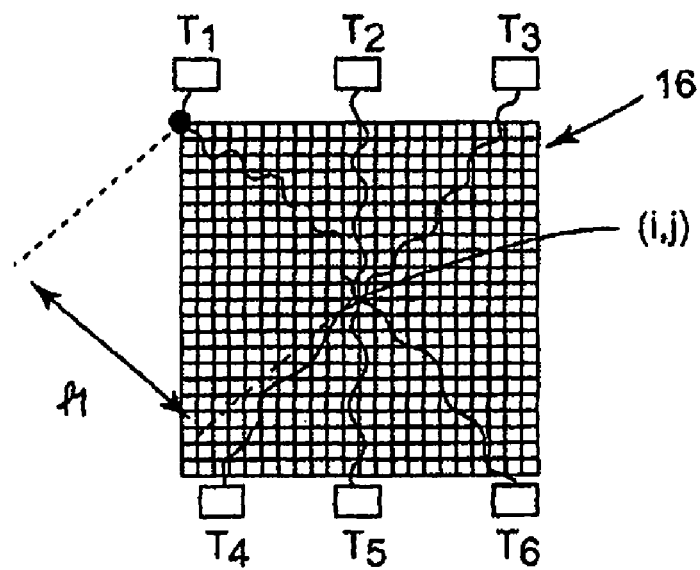
FIG.6

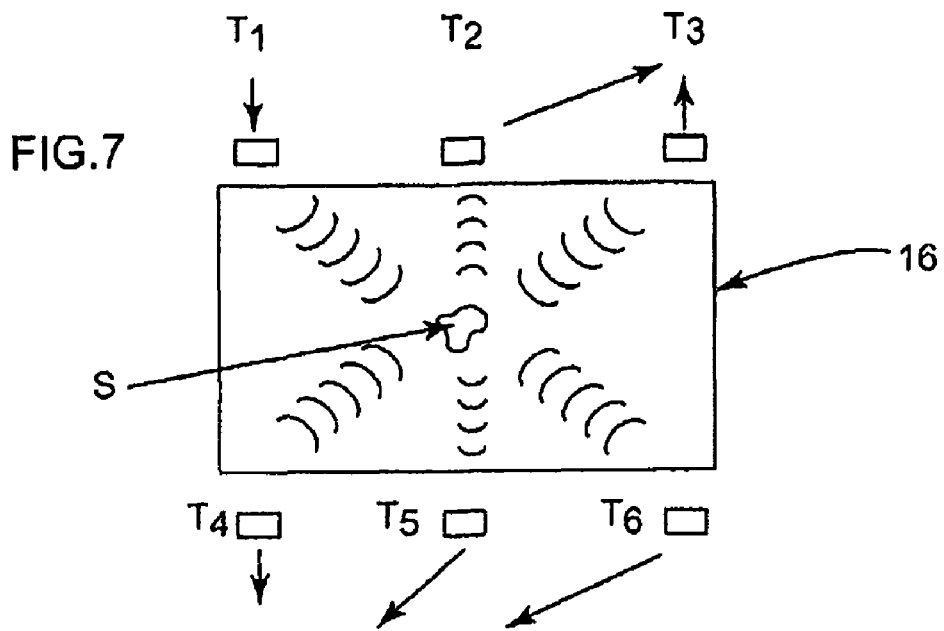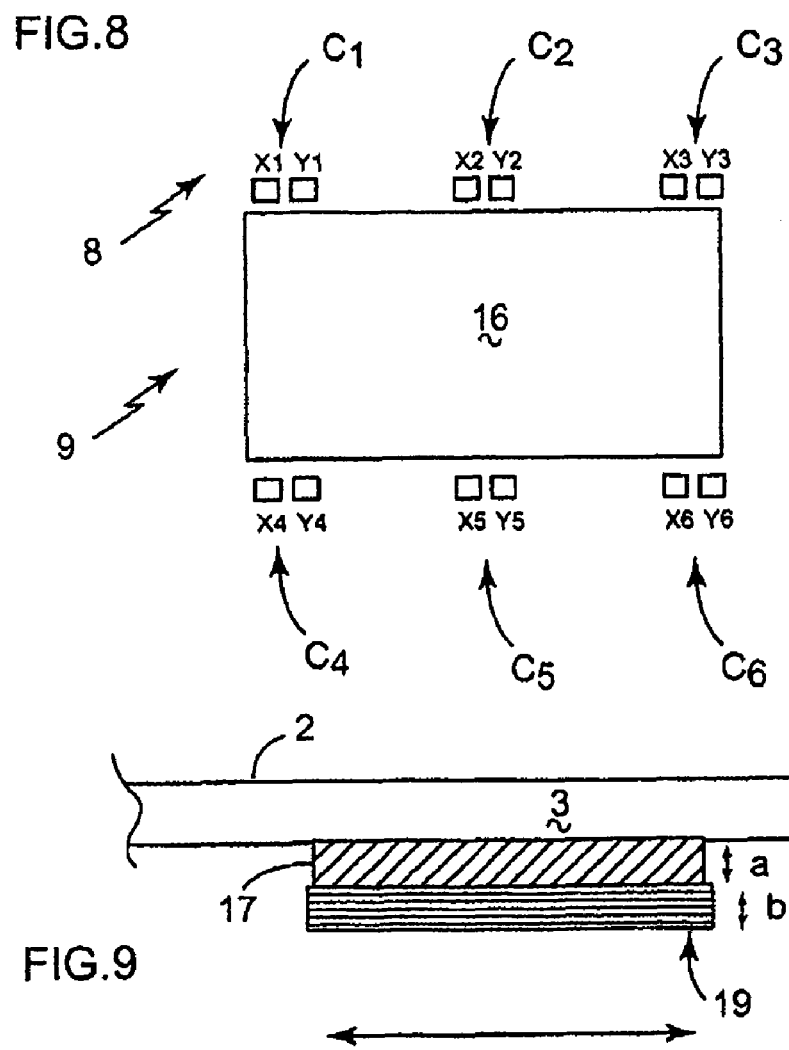

ANTI-ICING / DE-ICING SYSTEM AND METHOD AND AIRCRAFT STRUCTURE INCORPORATING THIS SYSTEM

CROSS REFERENCE TO RELATED APPLICATION

This application claims priority to French Application No. 08 01202, filed Mar. 5, 2008.

FIELD AND BACKGROUND OF THE INVENTION

The present invention relates to an anti-icing/de-icing system using ultrasound waves for an external surface of a structure likely to be iced, such as an aircraft wing or engine nacelle, such a structure incorporating this system and an anti-icing/de-icing method implemented by this system.

The use of ultrasound waves for de-icing airplane wings, helicopter blades or aircraft engine nacelles in particular is known. Document DE-A-10 2004 060 675 describes a device and a method using piezoelectric transducers arranged behind the leading edge of an airplane wing to handle the de-icing of the latter, with a working frequency chosen according to the rigidity of the structure of this wing.

Also known from the document WO-A-2007/095935 is the use of a two-dimensional network of transducers incorporated inside an airplane wing which emit ultra-sounds to measure, via a scan of the iced surface of the wing and the detection of the ultrasound waves reflected by the edges of this surface, the thickness of the layer of ice covering this wing.

A major drawback of the known deicing systems for these aircraft structures lies notably in the non-optimized energy consumption which is required to prevent the icing and/or satisfactorily de-ice at each instant all the relevant areas of the external surface of these structures.

SUMMARY OF THE INVENTION

One aim of the present invention is to propose an anti-icing system using ultrasound waves for an external surface of a structure likely to be iced, such as an aircraft wing or engine nacelle, this system comprising a plurality of piezoelectric transducers with which the structure is equipped facing this surface, the system remedying this drawback.

To this end, an anti-icing system according to the invention comprises means of scanning at least one matrix of elementary meshes predefined in this external surface related to regular arrangement of a group of these transducers, these scanning means being able to focus the waves emitted by all or some of the transducers of the or each group on these meshes one after the other, via signal summing means coupled to these scanning means and able to produce, for each mesh, a summation of the signals obtained from the transducers emitting these waves.

It will be noted that these summing and scanning means of the or each matrix of elementary meshes make it possible to protect against ice and/or effectively de-ice this structure, with an energy consumption that is reduced significantly in comparison to the existing anti-icing/de-icing systems.

Advantageously, the anti-icing system according to the invention can comprise a network formed by a plurality of these matrices each comprising a multitude of the meshes, for example present in a number between 500 and 5000 per matrix.

According to another characteristic of the invention, these summing means can be able to recalculate at each instant the wavelength and the phase of each signal emitted by each transducer of the or each group inside the or each associated matrix, so that these scanning means focus in a synchronized manner on each mesh the sum of the waves emitted with a maximum amplitude for the resultant wave.

According to another characteristic of the invention, said transducers can advantageously be mounted on an internal face or "skin" of said structure which is opposite said external surface. As a variant, they could be incorporated in this structure, inside a housing dedicated to the latter.

According to a preferred embodiment of the invention, the or each group of transducers associated with the or each matrix of meshes comprises two series of transducers respectively arranged facing and opposite two parallel peripheral edges of said external surface that are external to the corresponding matrix.

Optionally, according to this example of the invention, each of said series of transducers can comprise a plurality of pairs of transducers evenly spaced in a direction of the corresponding matrix, one of the two transducers of each pair being designed to replace the other transducer should the latter fail.

According to another characteristic of the invention, each transducer of the or each group is advantageously powered by an electric generator by means of cables that can be housed in said structure, and is connected to a memory coupled to a computer designed to calculate the parameters of the wave to be sent to each mesh, all of the transducers being linked to one and the same electronic management device able to control these scanning means according to determined scanning sequences.

Preferably, the system according to the invention comprises at least one device for measuring the temperature of said external surface which is coupled to said management device, to define the waves used in each scanning sequence.

Also preferably, the system according to the invention also comprises acoustic damping means that are at least able to avoid the propagation of said waves emitted from one of the matrices to the other adjacent matrices. These damping means can advantageously comprise separation damping strips between the matrices which are preferably each based on a visco-elastic elastomer, such as "Deltane", and which are respectively arranged opposite boundaries between the matrices, between an internal face of said structure opposite said external surface and a support plate, preferably metallic.

Even more preferably, these damping means can also comprise damping borders which are preferably each based on a visco-elastic elastomer, such as "Deltane", and which are arranged opposite a peripheral area of said external surface surrounding both the or each matrix and the associated transducers, these damping borders being able to avoid the reflection by edge effect of said waves emitted in each matrix.

According to an embodiment of the invention, the or each group of transducers can advantageously comprise reversible transducers which are successively able to emit and receive said waves, in particular for detecting by time turnaround the presence of iced areas on the or each matrix.

The anti-icing system according to the invention can also be used as a de-icing system, then also being able to successively de-ice said iced areas after detection of the latter by time turnaround, at least one of the transducers operating as emitter and the others as receiver, this system comprising emitted signal storage means coupled to stored signal compression and reversal means, said scanning means being able to refocus these reversed and compressed signals toward said iced areas.

Generally, each of the transducers used in the anti-icing/de-icing system according to the invention can advantageously be a multilayer piezoelectric transducer based on a ceramic material.

An aircraft structure according to the invention, likely to be iced on its external surface and such as a wing or engine nacelle surface, is characterized in that it incorporates an anti-icing system as defined hereinabove.

According to one example of the invention where this aircraft structure forms an airplane wing, each group of transducers associated with the or each matrix can advantageously comprise two series of transducers respectively arranged on the upper-surface and lower-surface sides opposite two parallel peripheral edges of said external surface which are external to this matrix, the transducers of each series being evenly spaced in a longitudinal direction of the structure and being coupled to two respectively upper-surface and lower-surface electrical power supply collectors.

According to the invention, the anti-icing method using ultrasound waves for an external surface of a structure likely to be iced, such as an aircraft wing or engine nacelle, this method using a plurality of piezoelectric transducers with which the structure is equipped adjacent to this surface, is such that it mainly comprises:
- an emission of traveling waves, in at least one matrix of elementary meshes predefined in this external surface in relation to an even arrangement of a group of these transducers, by all or some of the latter,
- a summation, for each mesh of this matrix, of signals obtained from the transducers emitting these waves and representative of the latter, and
- at least one scan of this matrix, to focus the resultant traveling waves emitted on these meshes one after the other.

In other words, each of the meshes of the or each matrix is protected from ice one after the other, by synchronously sending via the associated group of transducers traveling waves of lower amplitude but with a wavelength and phase that are recalculated at each instant to provoke a maximum of energy on the mesh (i, j) at the instance t then on the mesh (i+1, j+1) at the instant t+1, and so on. This mode of operation is advantageously less energy intensive.

According to another characteristic of the invention, it is possible to perform each scan of the or each matrix in a synchronized manner by recalculating at each instant the wavelength and the phase of said signals to maximize the vibratory energy on each mesh with a maximum total amplitude for the resultant signal, preferably corresponding to a displacement generated on these meshes that is equal to or greater than 1 µm.

Advantageously, it is possible to choose the dimensions of the or each matrix and the number of the transducers within each associated group according to the desired maximum scanning period.

Preferably, the transducers emit packets of waves focused on each mesh of the or each matrix to be treated, the frequencies of which are, for example, between 100 kHz and 5 MHz. Each transducer used can advantageously exhibit a thickness, measured according to the thickness of the structure, which is of the order of a half-ultrasound wavelength.

Also preferably, the temperature of said external surface is measured to choose the waves of the scanning sequence for each transducer.

Preferably, between the adjacent pairs of matrices, the waves emitted in one of them are damped to avoid their propagation to the adjacent matrix and/or the waves emitted in each matrix are damped to avoid the reflection by edge effect, around this matrix and the corresponding transducers.

As a variant, it is possible on the other hand to use the reflection by edge effect, around each matrix and the corresponding transducers, to generate standing waves.

As indicated previously, it is possible advantageously to provide pairs of transducers evenly spaced in a direction of each matrix, one of the transducers of each pair being used to replace the other transducer should the latter fail. In this context, tests are advantageously performed before placing the anti-icing in service (for example before each take-off of the airplane in the case of an airplane wing to be protected from ice), these tests consisting in:
- emitting a signal with an emitting transducer to be tested $X_t$ included in a pair of transducers $(X_t, Y_t)$ associated with the or each matrix, all the other transducers $X_k$ (k different from t) of the corresponding group being used in receiving mode and, in this case, in
- checking to see if at least one of these transducers $X_k$ in receiving mode does not receive this signal, preferably by using the time turnaround technique to refine the location of the emitting source by the transducers in receiving mode, and
- having the implementation of the anti-icing switched over to the other emitting transducer $Y_t$ because of failure of the transducer $X_t$.

According to another characteristic of the invention, it is also possible to implement a de-icing of said external surface by the time turnaround technique, for the or each matrix of meshes:
- by having a wave emitted to at least one transducer used in emitting mode associated with this matrix, this wave encountering a singularity provoked by an ice formation spot on this matrix,
- by picking up, by all or some of the other transducers associated with this same matrix and used in receiving mode, the signal representative of this wave having encountered this singularity, and by storing this signal in an internal memory, and
- by reversing and by compressing this signal to refocus the wave corresponding to this reversed and compressed signal towards said singularity, to successively de-ice the spots of ice as they form, after they have been located.

BRIEF DESCRIPTION OF THE DRAWINGS

Other characteristics, benefits and details of the present invention will emerge from reading the following description of several exemplary embodiments of the invention, given by way of nonlimiting illustration, said description being given with reference to the appended drawings, in which:

FIG. 4 is a simplified block diagram showing the functional couplings between the main component elements of the anti-icing/de-icing system according to the invention, for each of the transducers, FIG. 5 is a developed partial schematic view, like FIG. 2, of said area to be protected from icing or to be de-iced, showing its breakdown according to the invention into matrices of elementary meshes each associated with a group of transducers, FIG. 6 is a schematic view illustrating, for one of the matrices of FIG. 5, the focusing on each mesh of waves emitted according to the invention by the transducers of the associated group, FIG. 7 is a schematic view illustrating, for one of the matrices of FIG. 5, the operation of the anti-icing system according to the invention in de-icing mode, by the time turnaround technique, FIG. 8 is a schematic view illustrating, for one of the matrices of FIG. 5, the operation of the anti-icing system according to the invention in redundant mode via pairs of transducers, and FIG. 9 is a cross-sectional partial schematic view of the structure provided with the system according to the invention, along the plane IX-IX of FIG. 1, showing the mounting on an internal face of this structure of means of acoustically damping the waves emitted from one matrix to another.

MORE DETAILED DESCRIPTION

Figure 1:
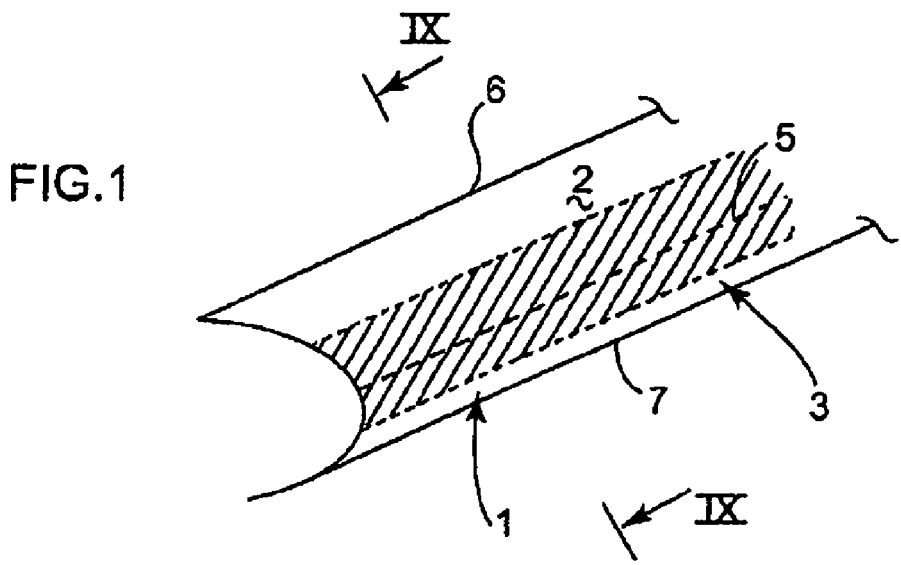
FIG. 1 is a partial schematic view of an aircraft wing structure illustrating, by way of example, an area of the external surface of this structure to be protected from icing or to be de-iced.

FIG. 1 shows a typical example of geometry of area 1 to be protected from icing or to be de-iced on an external surface 2 of an aircraft structure 3, such as an airplane wing or a helicopter blade, using the anti-icing/de-icing system 4 according to the invention (diagrammatically represented in FIG. 4). This area 1 allows as its longitudinal axis of symmetry, the leading edge line 5 of the wing or of the blade and extends on either side of this axis over the upper surface 6 and the lower surface 7 of the wing, for example.

Figure 2:
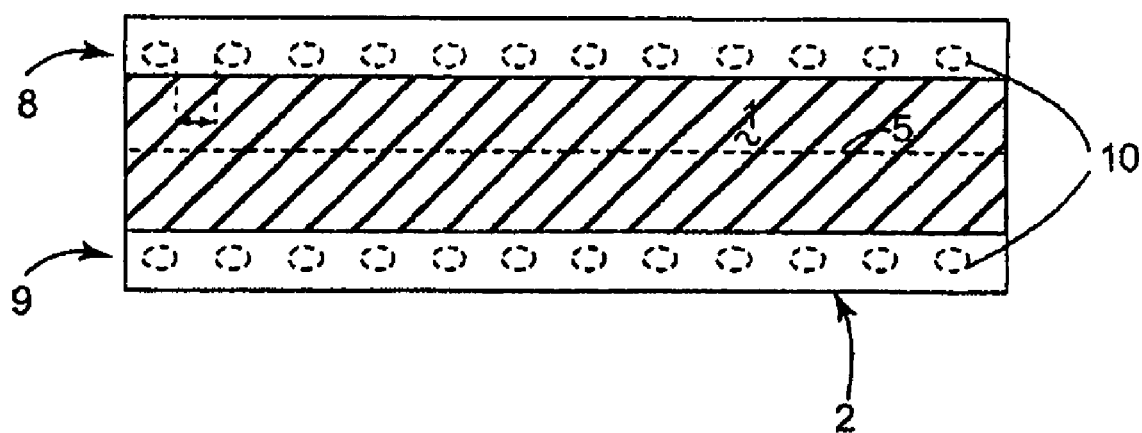
FIG. 2 is a developed plan view of the structure of FIG. 1 also illustrating an arrangement according to the invention of two series of piezoelectric transducers on either side of and along this area.
Figure 3:
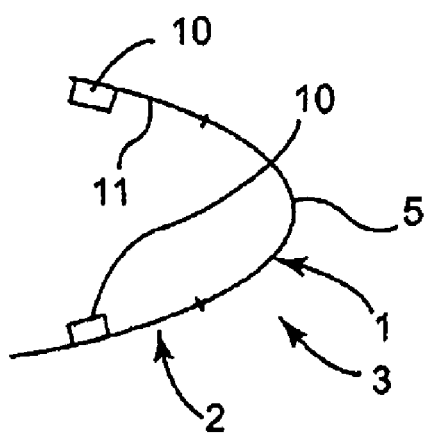
FIG. 3 is a partial schematic profile view of the structure of FIGS. 1 and 2, notably showing the mounting according to the invention of these transducers on an internal face of the structure.

FIGS. 2 and 3 show the preferred arrangement according to the invention of two series 8 and 9 of reversible piezoelectric transducers 10 (i.e., transducers that can operate only in emitting mode, in anti-icing mode, or also in receiving mode, in de-icing mode) on either side of this area 1 and on the internal face 11 of the structure 3 opposite to its external surface 2 to be treated. Each transducer 10 is designed to exhibit minimal dimensions, with a thickness of the order of a half-ultrasound wavelength, and is preferably of multilayer type based on ceramic materials.

These two series 8 and 9 of transducers are thus arranged symmetrically to each other relative to the leading edge line 5, in this example in the longitudinal direction of the structure 3. The transducers 10 of one and the same series 8, 9 are separated in pairs, for example by 20 cm, and are supplied by electrical power supply cables (not illustrated) situated inside the structure 3 (in the bottom part of the airplane wing or of the helicopter blade, for example). According to the size of the structure 3 and therefore of the number of transducers 10, it is possible to envisage using a lower-surface power supply collector and an upper-surface collector (not visible).

As illustrated in FIG. 4, each transducer 10 is essentially linked, on the one hand, to an electric generator 12 via the abovementioned cables and, on the other hand, to an independent memory 13 coupled to computation algorithms able to calculate the nature of the wave to be emitted (this independent memory 13 is used to implement the time turnaround technique described hereinbelow). Moreover, the transducers 10 are all linked to a common electronic management device 14 able to control scanning means making it possible to focus, via signal summing means coupled to these scanning means, the waves emitted by the transducers 10 to elementary measures (i, j) predefined in the area 1 to be treated (see FIGS. 5 and 6).

Moreover, the system 4 according to the invention also advantageously includes one or more devices 15 for measuring the temperature of the external surface 2, because the temperature influences the propagation of the waves in the material. The temperatures measured by this/these device(s) 15 can thus constitute input data for choosing the waves of the scanning sequence for each transducer 10.

As illustrated in FIG. 5, the area 1 to be treated is initially divided into at least one matrix 16 of elementary meshes (i, j) (only four matrixes 16 in the nonlimiting example of this figure, bearing in mind that it would be possible to provide more or fewer matrices 16), a mesh thus being identified by its coordinates (i, j), with i being an integer ranging from 1 to n and j being an integer ranging from 1 to m. In the case of an airplane wing or of a helicopter blade, this area 1 can, for example, exhibit a width of the order of 20 cm, and a length that can extend to several meters. The or each matrix 16 is thus virtually subdivided into meshes (i, j) of small surface area (for example 1 $cm^2$) opposite that of the structure 3. If n is used to denote the number of columns and m the number of rows, the n columns extend in the direction transversal to the leading edge 5 and the m rows in the direction parallel to this edge 5.

The n×m meshes (i, j) are thus advantageously grouped together in matrices 16 in the longitudinal direction, each matrix 16 being formed facing a group of piezo-electric transducers 10, which is subdivided into a part of each of the abovementioned two series 8 and 9. For example, each matrix 16 can comprise 1200 meshes (20 in the transversal direction, or over a width of 20 cm, and 60 in the longitudinal direction, or over a width of 60 cm). Thus, such or such a matrix 16 of the area 1 to be treated will be protected from ice only through the transducers 10 arranged directly facing this matrix 16, and the matrices 16 of meshes (i, j) will therefore be treated independently by the anti-icing/de-icing system 4 according to the invention.

As can be seen in FIG. 6, where the or each matrix 16 is situated in the field of action of x transducers $T_1$ to $T_6$ (six of them in this nonlimiting example, or three transducers $T_1$ to $T_3$ on the upper-surface side and three others $T_4$ to $T_6$ on the lower-surface side), the abovementioned scanning means make it possible to implement scanning sequences for the or each matrix 16 of meshes (i, j) in anti-icing mode, by focusing the waves emitted by the transducers $T_1$ to $T_6$ of the corresponding group on these meshes (i, j) one after the other, via said coupled signal summing means which are designed to produce for each mesh (i, j) a summation of the signals obtained from the transducers $T_1$ to $T_6$ emitting these waves. These summing means are designed to recalculate at each instant the wavelength and the phase of the signals emitted by each transducer $T_1$ to $T_6$ of each group inside the associated matrix 16, so that these scanning means synchronously focus on each mesh (i, j) the sum of the waves emitted with a maximum amplitude for the resultant wave.

There now follows a more detailed description of the implementation of the anti-icing method by means of the anti-icing/de-icing system 4 according to the invention used specifically in anti-icing mode, assuming a matrix 16 for example of 20×60 meshes (i, j), or 1200 meshes.

Instead of protecting the matrix 16 concerned from ice by using these transducers $T_1$ to $T_6$ to send waves (standing or traveling) having sufficient energy to de-ice at each instant the corresponding surface of this matrix 16 at all points, a choice is made according to the present invention to protect each of the meshes (i, j) of the matrix 16 from ice one after the other, by synchronously sending via these six transducers $T_1$ to $T_6$ waves of smaller amplitude but with a wavelength and phase that will be recalculated at each instant to provoke a maximum of energy on the mesh (i, j) at the instant t then on the mesh (i+1, j+1) at the instant t+1, and so on. This mode of operation notably offers the benefit of being less energy-intensive.

For example, if the desire is to treat the mesh (i, j) using four transducers (denoted $T_1$ to $T_4$) by sending these waves, then:

$l_k$ is used to denote the distance between the mesh (i, j) and the transducer $T_k$ (the distance $l_1$ for k=1 is represented in FIG. 6);

$\lambda_k$ is used to denote the wavelength of the wave sent by the transducer $T_k$ (function of the velocity of the waves in the material concerned, for example equal to approximately 5000 m/s in a titanium structure 3); and $\phi_k$ denotes the phase of the wave sent by the transducer $T_k$ and $A_k$ its maximum amplitude.

Taking the instant at which the amplitudes are at the maximum (and all at the same time), experience shows that the amplitude $A_k$ is insufficient to ensure anti-icing, because of a displacement generated on the meshes (i, j) which is less than a micron. The following applies:

$$U_k(x,t_o)=A_k\cos(x/\lambda_k+\phi_k)$$

(x being the distance to the transducer $T_k$).

The desired condition for an anti-icing situation on the mesh (i, j) is given by:

$$[l_k-\phi_k\lambda_k/2\pi]/\lambda_k=E([l_k-\phi_k\lambda_k/2\pi]/\lambda_k)$$

for all the k at the instant $t_o$, where E represents the integer part.

On the mesh (i, j), the resultant amplitude $U_{ij}$ of the traveling waves obtained is therefore:

$U_{ij}=\Sigma_k A_k$, the amplitude this time being sufficient to ensure anti-icing using the inventive method.

According to the positioning of the transducers $T_k$ and the parameters of the waves injected to ensure non-icing of the mesh (i, j) (amplitude, wavelength, phase), other meshes (i, j) may possibly be in a non-icing situation.

Preference is given to the use of packets of waves sent by each transducer $T_k$ and already focused on the mesh (i, j) to be treated, which makes it possible to expend less electrical energy.

Thus, according to the geometry chosen for the area 1 to be treated, anti-icing scanning sequences make it possible to optimize a scanning period. To give an idea of the orders of magnitude, it is possible to estimate that each scan according to the invention lasts around a millisecond, the period of a complete scan of each matrix 16 of meshes (i, j) then being less than 1200/1000=1.2 seconds. Since this period needs to be as short as possible to ensure good operation in anti-icing mode, the dimensions of each matrix 16 and the number of transducers $T_k$ can be dimensioned according to the desired maximum scanning period.

To take account of the limited lifetime of the piezo-electric transducers $T_k$, it is advantageously possible to choose to use these transducers $T_k$ with redundancy, as illustrated in FIG. 8. Compared to the exemplary embodiment described hereinabove, each transducer $T_k$ is in this case replaced by a pair $C_k$ of transducers $X_k$ and $Y_k$, of which only one transducer will operate (FIG. 8 thus illustrates, with reference to the example of FIG. 6, six pairs of transducers $C_1(X_1,Y_1)$, $C_2(X_2,Y_2)$, $C_3(X_3,Y_3)$, $C_4(X_4,Y_4)$, $C_5(X_5,Y_5)$ and $C_6(X_6,Y_6)$).

Thus, before the system 4 according to the invention is put into service (for example before each airplane take-off), it is possible to use a test phase by emitting any signal with one of the transducers $X_t$, all the other transducers $X_k$ (k being different from t) then being in receiving mode. If none of the transducers in receiving mode receives a signal, then the transducer $X_t$ will be declared to have failed and the system 4 according to the invention will switch over for anti-icing to the other transducer $Y_t$ of the pair of transducers $C_t$. The time turnaround technique (detailed hereinbelow in the de-icing part) can be used to refine the locating of the source S by the transducers in receiving mode.

When put into service, and in order to limit the electrical energy consumption and preserve the lifetime of the transducers $T_k$, it is advantageously possible to choose to engage the system 4 according to the invention only in icing conditions. To this end, it is possible to use this system 4 in detection mode by using a smaller number of transducers $T_k$ and/or dedicated transducers (generating weaker energy) which operate according to the time turnaround technique. Regular ice-presence tests can thus be carried out. The benefit of monitoring the presence of ice with a dedicated network is that it preserves the lifetime of the anti-icing transducers $T_k$.

As illustrated in FIGS. 5 and 9, the matrices 16 of adjacent meshes (i, j) are advantageously separated from each other by acoustic damping means 17, 18 that are at least able to avoid the propagation of the waves from one matrix 16 to another and which comprise damping strips 17 based on a visco-elastic elastomer, such as "Deltane". These damping strips 17 are respectively arranged opposite boundaries between the matrices 16, between the internal face 11 of the structure 3 opposite to the external surface 2 to be treated and a metallic support plate 19, made of titanium for example. For a structure that is 2.5 mm thick, the thickness a of each "Deltane" damping strip 17 is, for example, 0.5 mm thick and the thickness b of the titanium support plate 19 is, for example, also 0.5 mm. In this way, the matrices 16 are managed independently of each other when implementing the anti-icing or the de-icing according to the invention.

Preferably, these damping means 17, 18 also comprise borders 18 (visible in FIG. 5) which are also based on a visco-elastic elastomer such as "Deltane", and which are arranged opposite a peripheral area of the area 1 to be treated surrounding both the matrices 16 and the transducers 10, these damping borders 18 being designed to avoid the reflection by edge effect of the waves emitted in each matrix 16. It is thus possible to simplify the management of the anti-icing waves within each matrix 16.

As a variant, it would conversely be possible to use the reflection by edge effect, around each matrix 16 and the corresponding transducers 10, to generate standing waves therein.

According to an important characteristic of the invention, it is also possible to use the anti-icing system 4 to de-ice the external surface 2 of the aircraft structure 3, in the case of excessive icing, in order to make do with the anti-icing mode. In this case, the de-icing mode is selected by advantageously implementing the time turnaround technique. Unlike the anti-icing mode described previously, the objective here is to locate the ice formation points and treat them as they appear.

Referring to FIG. 7, the time turnaround principle is based on the multimodal and dispersive nature of the ultrasound waves. It consists in "listening" for the signals coming from a source S, picking up these signals using a piezoelectric transducer $T_k$ and storing them in an internal memory. These signals can then be reversed (i.e., in the sense of a reverse chronology) and re-emitted after reversal. It can be seen that the wave thus turned around and re-emitted uses the same path returning as it did outbound and is refocused on the source point S. This entails using reversible transducers $T_k$, i.e. transducers that can function successively in receiving mode and in emitting mode. The time turnaround is based on the uniqueness of the response according to the place of emission. Moreover, a choice is advantageously made to compress the received wave before re-emitting it, to concentrate the energy on this source point S. The time turnaround can thus be exploited to produce the map of the acoustic signatures of a previously "insonified" surface:

The operation of the system 4 according to the invention in de-icing mode is therefore as follows:

- on the or each matrix 16 of meshes (i, j), one or more transducer(s) $T_1$ acting as emitter emits an ultra-sound wave,
- this wave "crosses" the path of the singularity S provoked by the local accumulation of ice on the external surface 2 to be treated of the structure 3,
- the other transducers $T_2$ to $T_6$ of this matrix 16, which then operate in receiving mode, receive a signal originating from this wave, and
- this received signal is reversed and compressed to return to the singularity S, the duly refocused energy making it possible to effectively free the ice from the structure 3.

It will again be noted that the system 4 according to the invention also makes it possible to reduce the energy consumption in de-icing mode, compared to the existing de-icing systems.

The invention claimed is:

1. An anti-icing system using ultrasound waves for an external surface of a structure likely to be iced, such as a wing or an engine nacelle of an aircraft, this system comprising a plurality of piezoelectric transducers with which the structure is equipped facing this external surface, and comprising means for scanning at least one matrix of elementary meshes predefined in this surface related to a regular arrangement of a group of these transducers, these scanning means being able to focus the waves emitted by all or some of the transducers of the or each group on these meshes one after the other, via means for summing signals coupled to these scanning means and able to produce, for each mesh, a summation of the signals obtained from the transducers emitting these waves.

2. An anti-icing system according to claim 1, wherein these summing means are able to recalculate at each instant the wavelength and the phase of each signal emitted by each transducer of the or each group inside the or each associated matrix, so that these scanning means focus in a synchronized manner on each mesh the sum of the waves emitted with a maximum amplitude for the resultant wave.

3. An anti-icing system according to claim 1, wherein said transducers are mounted on an internal face of said structure which is opposite said external surface.

4. An anti-icing system according to claim 1, wherein the or each group of transducers associated with the or each matrix of meshes comprises two series of transducers respectively arranged facing and opposite two parallel peripheral edges of said external surface that are external to the corresponding matrix.

5. An anti-icing system according to claim 4, wherein each of said series of transducers comprises a plurality of pairs of transducers evenly spaced in a direction of the corresponding matrix, one of the two transducers of each pair being designed to replace the other transducer should the latter fail.

6. An anti-icing system according claim 1, wherein each transducer of said or each group is powered by an electric generator by means of cables housed in said structure, and is connected to a memory coupled to a computer designed to calculate the parameters of the wave to be sent to each mesh, all of the transducers being linked to one and the same electronic management device able to control these scanning means according to determined scanning sequences.

7. An anti-icing system according claim 6, further comprising at least one device for measuring the temperature of said external surface which is coupled to said management device, to define the waves used in each scanning sequence.

8. An anti-icing system according to claim 1, further comprising means for acoustic damping that are at least able to avoid the propagation of said waves emitted from one of the matrices to the other adjacent matrices.

9. An anti-icing system according to claim 8, wherein said damping means comprise separation damping strips between the matrices which are respectively arranged opposite boundaries between the matrices, between an internal face of said structure opposite said external surface and a support plate.

10. An anti-icing system according to claim 9, wherein said damping means also comprise damping borders which are each based on a visco-elastic elastomer, and which are arranged opposite a peripheral area of said external surface surrounding both the or each matrix and associated transducers, these damping borders being able to avoid the reflection by edge effect of said waves emitted in each matrix.

11. An anti-icing system according to claim 1, wherein the or each group of transducers comprises reversible transducers which are successively able to emit and receive said waves for detecting by time turnaround the presence of iced areas on the or each matrix.

12. An anti-icing system according to claim 11, wherein the anti-icing system is also able to successively de-ice said iced areas after detection of the latter by time turnaround, at least one of the transducers operating as emitter and the others as receiver, this system comprising means for emitted signal storage coupled to means for stored signal compression and reversal, said scanning means being able to refocus these reversed and compressed signals toward said iced areas.

13. An anti-icing system according to claim 1, wherein each of the transducers is a multilayer piezoelectric transducer based on a ceramic material.

14. An anti-icing system according to claim 1, comprising a network formed by a plurality of matrices each comprising a multitude of the meshes, the latter being present in a number between 500 and 5000 in each matrix.

15. An aircraft structure likely to be iced on its external surface, such as a wing or engine nacelle surface, comprising an anti-icing system according to claim 1.

16. An aircraft structure forming an airplane wing according to claim 15, wherein each group of transducers associated with the or each matrix comprises two series of transducers respectively arranged on the upper-surface and lower-surface sides opposite two parallel peripheral edges of said surface which are external to this matrix, the transducers of each series being evenly spaced in a longitudinal direction of the structure and being coupled to two respectively upper-surface and lower-surface electrical power supply collectors.

17. An anti-icing method using ultrasound waves for an external surface of a structure likely to be iced, such as an aircraft wing or engine nacelle, this method using a plurality of piezoelectric transducers with which the structure is equipped adjacent to this surface, said method comprising:
- emitting traveling waves, in at least one matrix of elementary meshes predefined in this external surface in relation to an even arrangement of a group of these transducers, by all or some of the waves, summing, for each mesh of this matrix, signals obtained from the transducers emitting these waves and representative of the latter, and at least one scan of this matrix, to focus the resultant traveling waves emitted these meshes one after the other.

18. An anti-icing method according to claim 17, wherein each scan of the or each matrix is performed in a synchronized manner by recalculating at each instant the wavelength and the phase of said signals to maximize the vibratory energy on each of the meshes with a maximum total amplitude for the resultant signal.

19. An anti-icing method according to claim 17, wherein the dimensions of the or each matrix and the number of the transducers within each associated group are chosen according to the desired maximum scanning period.

20. An anti-icing method according to claim 17, wherein the transducers emit packets of waves focused on each mesh of the or each matrix to be treated, the frequencies of which are between 100 kHz and 5 MHz.

21. An anti-icing method according to claim 17, wherein the temperature of said external surface is measured to choose the waves of the scanning sequence for each transducer.

22. An anti-icing method according to claim 17, wherein a plurality of the matrices is defined on said external surface which each comprise a multitude of the meshes, for example present in a number between 500 and 5000 per matrix.

23. An anti-icing method according to claim 22, wherein, between the adjacent pairs of matrices, the waves emitted in one of them are damped to avoid their propagation to the adjacent matrix.

24. An anti-icing method according to claim 17, wherein the waves emitted in each matrix are damped to avoid the reflection by edge effect, around this matrix and the corresponding transducers.

25. An anti-icing method according to claim 17, wherein the reflection by edge effect, around each matrix and the corresponding transducers, is used to generate standing waves.

26. An anti-icing method according to claim 17, wherein pairs of transducers are provided, evenly spaced in a direction of the corresponding matrix, one of the two transducers of each pair being used to replace the other transducer should the latter fail.

27. An anti-icing method according to claim 26, wherein tests are carried out before implementing the anti-icing, comprising:

emitting a signal with an emitting transducer to be tested included in a pair of transducers associated with the or each matrix, all the other transducers of the corresponding group being used in receiving mode and, in this case, in checking to see if at least one of these transducers in receiving mode does not receive this signal, by using the time turnaround technique to refine the location of the emitting source by the transducers in receiving mode, and having the implementation of the anti-icing switched over to the other emitting transducer because of failure of the transducer.

28. An anti-icing method according to claim 17, wherein there is also implemented a de-icing of said external surface by the time turnaround technique, for the or each matrix of meshes:

by having a wave emitted to at least one transducer used in emitting mode associated with the or each matrix, this wave encountering a singularity provoked by an ice formation spot on this matrix, by picking up, by all or some of the other transducers associated with this same matrix and used in receiving mode, the signal representative of this wave having encountered this singularity, and by storing this signal in an internal memory, and by reversing and by compressing this signal to refocus the wave corresponding to this reversed and compressed signal towards said singularity, to successively de-ice the spots of ice as they form, after they have been located.

29. An anti-icing method according to claim 17, wherein each of the transducers exhibits a thickness, measured in the direction of the thickness of the structure, which is of the order of a half-ultrasound wavelength.

30. An anti-icing method according to claim 17, wherein each scan of the or each matrix is performed in a synchronized manner by recalculating at each instant the wavelength and the phase of said signals to maximize the vibratory energy on each of the meshes with a maximum total amplitude for the resultant signal corresponding to a displacement generated on these meshes equal to or greater than 1 μm.

* * * * *